April 5, 1960  A. E. MARTIN  2,931,266
SPECTROMETERS
Filed June 19, 1956

United States Patent Office 2,931,266
Patented Apr. 5, 1960

2,931,266

SPECTROMETERS

Albert E. Martin, Newcastle-upon-Tyne, England, assignor to C. A. Parsons & Company Limited, Newcastle-upon-Tyne, England Application June 19, 1956, Serial No. 592,427

Claims priority, application Great Britain June 21, 1955

6 Claims. (Cl. 88—14)

This invention relates to spectrometers of the kind in which a plane diffraction grating is used for the production of spectra.

The invention is particularly, though not exclusively, applicable to infra-red spectrometers.

In such spectrometers parallel radiation is caused to fall on a plane ruled grating, which may be an original or a replica, where it suffers diffraction. Some of the rays diffracted will reinforce each other if the following equation is satisfied:

$d \sin i_1 + d \sin i_2 = n\lambda$, where $d$ is the spacing of the lines ruled on the grating
$i_1$ is the angle of incidence
$i_2$ is the angle of diffraction
$\lambda$ is the wavelength of the particular wavelength under consideration and
$n$ is an integer indicating the order of the spectrum.

This is frequently referred to as the grating equation.

Figure 1 of the accompanying diagrammatic drawings relates to the above equation.

In infra-red spectrometers a Littrow arrangement of a plane grating is commonly used and in this case the grating equation becomes:

$$2d \sin i = n\lambda$$

where $$i_1 = i_2 = i$$

If the grating is rotated at constant angular speed $$\frac{d\lambda}{dt} \alpha \frac{di}{dt}$$

and is constant, provided that $i$ is small, and a close approximation to a linear wavelength scale is obtained.

The object of the invention is to provide means for rotating a plane ruled diffraction grating by means of a screw in such a way that an exact linear relationship is obtained between the turns of the screw and the reciprocal of wavelength or wave number.

According to the invention a plane ruled diffraction grating in a spectrometer is rotatable about an axis parallel to rulings on its surface and motion is imparted to the grating by means of a lever arm rigid with the grating, said lever arm being actuated by a member having a part of its periphery in contact with a straight edge of the lever arm, the straight edge or prolongation thereof passing through the axis of rotation of the grating and the part of the periphery of the actuating member in contact with said edge being of circular contour, said actuating member being constrained to move, under the action of a screw, in a direction such that the centre of curvature of its circular part moves in a straight line passing through the axis of rotation of the grating.

According to a further feature of the invention, the angle which the lever arm or projection thereof in the plane perpendicular to the rulings on the grating makes with the direction of motion of the lever actuating member or projection thereof in the same plane is made equal to the sum of the angle of incidence of the radiations falling on the grating and half the difference between the angle of diffraction and angle of incidence on the grating of said radiation.

According to a further feature of the invention, the screw transmitting motion to the lever actuating member is a micrometer screw.

According to a further feature of the invention, the radius of curvature of the part of the lever actuating member having a circular periphery is made equal to $50h/d \cos \delta/2$ where $d$ is the spacing of the rulings on the grating in microns, $\delta$ is the difference between the angle of diffraction and the angle of incidence, and $h$ is the displacement of the end of the screw corresponding to 100 wave numbers in the first order on the wave-number scale.

According to a further feature of the invention, the movement of the screw is communicated to the lever actuating member by means of a wedge-shaped member attached to or made integral with said lever actuating member.

According to yet a further feature of the invention, the movement of the screw is communicated to the lever actuating member by a further lever arm.

Referring to the accompanying drawings.

Figure 2:
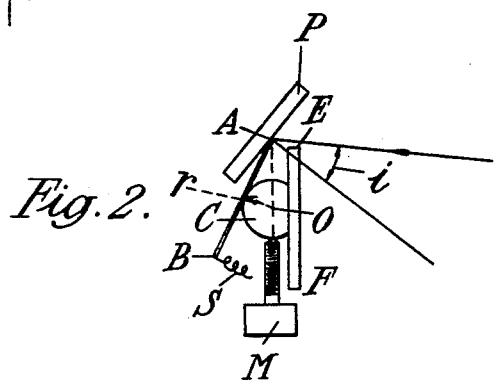
Figures 2–4 show three alternative ways of carrying out the invention.

In carrying the invention into effect in one form by way of example and as illustrated in Figure 2, a plane ruled diffraction grating P is pivoted so as to rotate about an axis passing through A and parallel to the rulings on its surface and AB is a straight arm rigidly attached to the grating, said arm or prolongation thereof passing through the centre A about which the grating rotates. The arm AB is actuated by a member C having that part of its periphery which is in contact with arm AB of circular contour and being constrained to move along a diameter passing through A when the screw M, preferably a micrometer screw, is rotated. The axis of the screw is conveniently though not necessarily a continuation of AO where O is the centre of the circular part of the periphery. The arm AB is held in contact with C by means of the spring S and a fixed straight guide EF is provided so that a flat side of C can slide along it. The screw is conveniently furnished with a rounded end which makes contact with a hardened flat on C.

The member C may be tapered in a direction perpendicular to the plane of the paper.

Suppose at wave-number $$N\left(=\frac{10,000}{\lambda(\text{microns})}\right)$$

the angle of incidence is $i$, while at wave-number $N-100$ the angle is increased to $i+\alpha$ and assuming that the screw used is a micrometer screw whose movement is thereby increased by 0.1", then for the first order, $$\sin i = \frac{\lambda}{2d} = \frac{10,000}{2Nd} = \frac{r}{AO}$$

provided BAO is made equal to the angle of incidence $i$ and making use of the fact that AB is a tangent to the circular part of the member C, $r$ being the radius of the circular contour. If the angle BAO is made equal to the angle of incidence for one setting of the grating the angles will of course remain equal for all other settings. Similarly, $$\frac{2d(N-100)}{10,000} = \frac{AO-h}{r}$$

and $$\frac{200d}{10,000} = \frac{h}{r}$$

Thus 0.1" on the micrometer will always represent the same wave-number interval for any setting of the grating and, if, in addition $$r(\text{inches}) = \frac{50h}{d}$$

($d$ in microns), 0.1" will exactly represent 100 cm.$^{-1}$ in the first order, 200 cm.$^{-1}$ in the second, and so on. As an example, if the grating has 2,400 lines to the inch, $d=10.583$ microns and $2r=0.9449"$.

Figure 3:
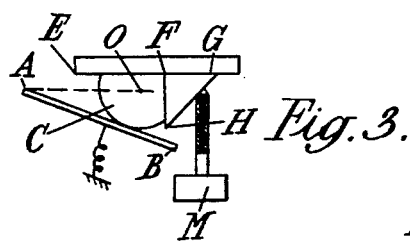

Figure 3 illustrates an alternative way of communicating the micrometer movement to the member C. A wedge-shaped plate is either rigidly attached to C or made integral with it, the straight line FG being a continuation of EF. The end of the micrometer screw bears on the straight edge GH and as the screw is advanced C is constrained to slide to the left along EG. If the angle FGH is $\gamma$ and the micrometer screw is advanced by a distance S, C moves a corresponding distance S. cot $\gamma$. This construction has the advantage of providing a means for making the micrometer scale exact, since it is only necessary to vary the angle FGH until the desired result is obtained.

Figure 4:
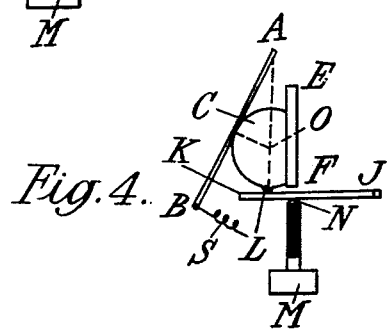

In Figure 4 a modified construction is shown in which a lever arm JK, pivoted at J, is used to move C in the direction LOA as the screw is advanced, the point of application of the screw being at N. The screw is ball-ended at N and a ball is also fitted in the circular member C at L so as to bear on the lever arm JK.

Figure 1:
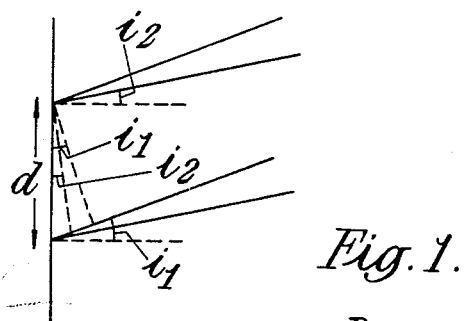
Figure 1 shows the paths of the incident and diffracted radiations to and from the grating.

For the more general case of Figure 1 where angles of incidence and diffraction are different, we can write $$d(\sin i_1 + \sin(i_1+\delta)) = n\lambda$$

where $$\delta \text{ is equal to } i_2 - i_1$$

and is constant for a given spectrometer. Now $$\sin i_1 + \sin(i1+\delta) = 2\sin(i_1+\delta/2)\cos\delta/2 = \frac{n\lambda}{d}$$

and in the first order $$\sin\left(i_1+\frac{\delta}{2}\right) = \frac{\lambda}{2d\cos\delta/2}$$

Again, an exact linear wave-number scale can be obtained if angle BAO is made equal to $i_1+\delta/2$ and 0.1" movement of the screw say a micrometer screw, will represent 100 cm.$^{-1}$ provided that $$r(\text{inches}) = \frac{5}{d\cos\delta/2}$$

($d$ in microns). As before 0.1" on the micrometer will represent 200 cm.$^{-1}$ in the second order, and so on.

In the above description the use of a screw has been described but the invention does not preclude the use of other means for transmitting motion to the lever actuating member the movement of which can conveniently be measured.

I claim:
1. A spectrometer comprising a plane ruled diffraction grating, means mounting the grating for rotation about an axis parallel to its rulings, means for imparting motion to the grating comprising a lever arm rigid with the grating and having a straight edge lying in a line passing through the said axis of rotation of the grating, means for actuating said lever arm comprising an actuating member having part of its periphery of circular contour and in contact with the said straight edge of the lever arm, and means for moving said actuating member comprising a screw operable to move the actuating member in a direction such that the center of curvature of its said circular part moves in a straight line passing through the axis of rotation of the grating, the said screw being evenly graduated so that a direct wave number indication is obtained.

2. A spectrometer as claimed in claim 1 wherein the angle which the lever arm or projection thereof in the plane perpendicular to the rulings on the grating makes with the direction of motion of the lever actuating member or projection thereof in the same plane is made equal to the sum of the angle of incidence of the radiations falling on the grating and half the difference between the angle of diffraction and angle of incidence on the grating of said radiation.

3. A spectrometer as claimed in claim 1 wherein the screw transmitting motion to the lever actuating member is a micrometer screw.

4. A spectrometer as claimed in claim 1 wherein the radius of curvature of the part of the lever actuating member having a circular periphery is made equal to $50h/d \cos \delta/2$ where $d$ is the spacing of the rulings on the grating in microns, $\delta$ is the difference between the angle of diffraction and the angle of incidence, and $h$ is the displacement of the end of the screw corresponding to 100 wave numbers in the first order on the wave-number scale.

5. A spectrometer as claimed in claim 1 wherein the movement of the screw is communicated to the lever actuating member by means of a wedge-shaped member attached to or made integral with said lever actuating member.

6. A spectrometer as claimed in claim 1 wherein the movement of the screw is communicated to the lever actuating member by a further lever arm.

References Cited in the file of this patent
UNITED STATES PATENTS

| | | |
|---|---|---|
| 1,985,067 | Wandersleb | Dec. 18, 1934 |
| 2,023,313 | DiCarlo et al. | Dec. 3, 1935 |
| 2,445,044 | Stamm et al. | July 13, 1948 |

OTHER REFERENCES

Badger et al.: "A Vacuum Spectograph for the Infra-Red," pages 861–865, Review of Scientific Instruments, vol. 19, No. 12, December 1948. (Copy in U.S. Patent Office library.)

Fastie: "A Small Plane Grating Monochromator," pages 641–647, Journal of the Optical Society of America, vol. 42, No. 9, Sept. 1952. Page 644 relied upon.